US006181862B1

(12) United States Patent
Noble et al.

(10) Patent No.: US 6,181,862 B1
(45) Date of Patent: Jan. 30, 2001

(54) INTERBAY FIBER OPTIC STORAGE UNIT

(75) Inventors: Jennifer D. Noble, Fort Worth; Carrie Lynn Gordon, Saginaw, both of TX (US)

(73) Assignee: Siecor Operations LLC, Hickory, NC (US)

( * ) Notice: Under 35 U.S.C. 154(b), the term of this patent shall be extended for 0 days.

(21) Appl. No.: 09/268,436

(22) Filed: Mar. 12, 1999

(51) Int. Cl.[7] ........................................ G02B 6/00
(52) U.S. Cl. ............................. 385/135; 385/134
(58) Field of Search ................................. 385/135, 136, 385/137; 379/327, 328, 329

(56) References Cited

U.S. PATENT DOCUMENTS

| 5,402,515 | * | 3/1995 | Vidacovich et al. | 385/134 |
|---|---|---|---|---|
| 5,640,482 | | 6/1997 | Barry et al. | 385/135 |
| 5,758,002 | * | 5/1998 | Walters | 385/134 |
| 5,758,003 | * | 5/1998 | Wheeler et al. | 385/134 |

FOREIGN PATENT DOCUMENTS

| 4336079 | 7/1986 | (DE) | G02B/6/36 |
|---|---|---|---|
| 0329935A2 | 8/1989 | (EP) | G02B/6/44 |
| 0593927A1 | 4/1994 | (EP) | G02B/6/44 |
| 0183579A1 | 4/1995 | (EP) | G02B/6/44 |

* cited by examiner

Primary Examiner—Cassandra Spyrou
Assistant Examiner—Euncha Cherry

(57) ABSTRACT

An optical fiber storage unit mounts to each side of a fiber optic storage rack. The storage unit has a pair of longitudinally extending parallel rails. Hubs are mounted along the rails and spaced apart from each other. Some of the hubs protrude rearward from the rails and some protrude forward. The rails are laterally spaced apart from each other. This provides openings for the passage of optical fibers from the front to the back of the rack. The rails and the hub assemblies have curved portions to avoid excessive bending of the fibers.

24 Claims, 3 Drawing Sheets

INTERBAY FIBER OPTIC STORAGE UNIT

BACKGROUND

The present invention is directed to fiber optic connector systems and in particular to a storage unit for mounting to a rack containing a plurality of fiber optic connector housings containing connector panels.

Fiber optic cables are used for transmitting voice, data, and video communications. In some installations, a large number of fiber optic cables must be interconnected with other fiber optic cables extending throughout the user's facility. For large systems, storage racks are often used. A storage rack is a vertical rack that supports itself on the floor and holds a number of fiber optic connector panels in housings, with the housings spaced one above the other. The connector panels have large number of apertures for various connectors/adapters used in connecting the optical fibers. Some of the systems also contain electronics that must be interconnected with the fiber connector panels. In some cases, massive amounts of optical fiber are required to be stored and routed from the front and back of the frame. Care must be taken in storage of the optical fibers to avoid bending the optical fibers more than a specified radius (the bend radius), usually 1.25–1.50 inches.

SUMMARY OF THE INVENTION

In this invention, a storage unit mounts to at least one of the vertical sides of the storage rack. Each storage unit has a pair of longitudinal extending parallel rails, each of the rails having a front and a back. The rails are connected to each other and spaced apart, defining openings between the rails to allow the passage of optical fibers from the front to the back. The rails also carry hubs to allow for storage of slack optical fibers. The hubs are longitudinally spaced along the rails. Some of the hubs protrude rearward from the rails and some of the hubs protrude forward from the rails.

In the preferred embodiment, the hubs are mounted to spacers that interconnect and maintain the rails in parallel. Both the rails and the spacers preferably have curved portions that join the front and the back and prevent excessive bending of the optical fibers.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the invention and, together with the description, serve to explain the principles of the invention.

DETAILED DESCRIPTION OF THE INVENTION

Figure 1:
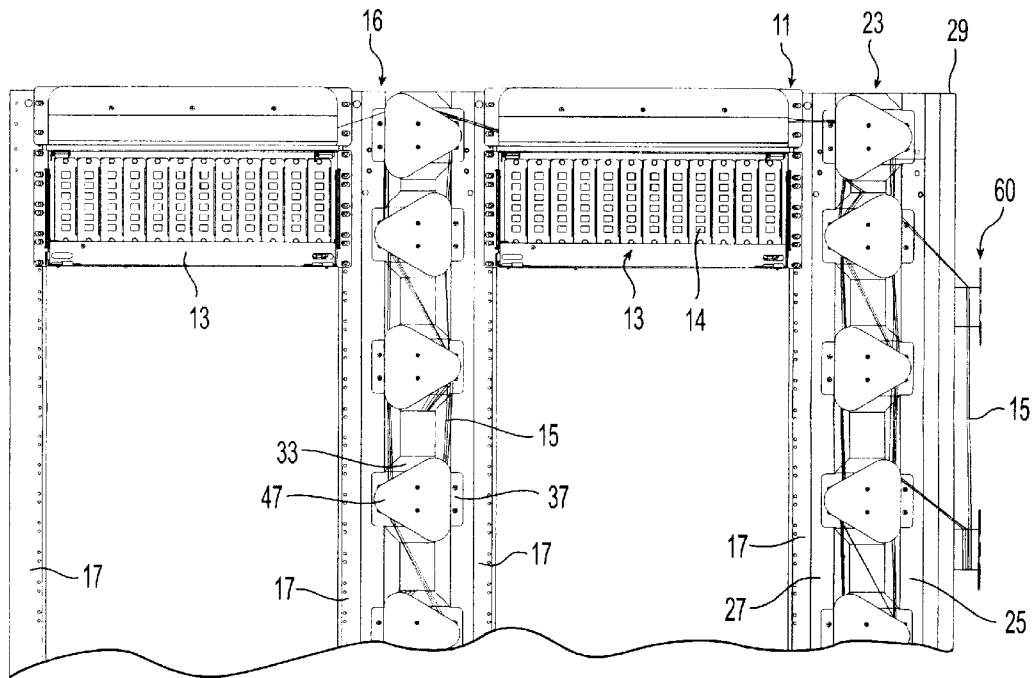
FIG. 1 is a front elevational view showing portions of two storage racks having storage units constructed according to the present invention.
Figure 2:
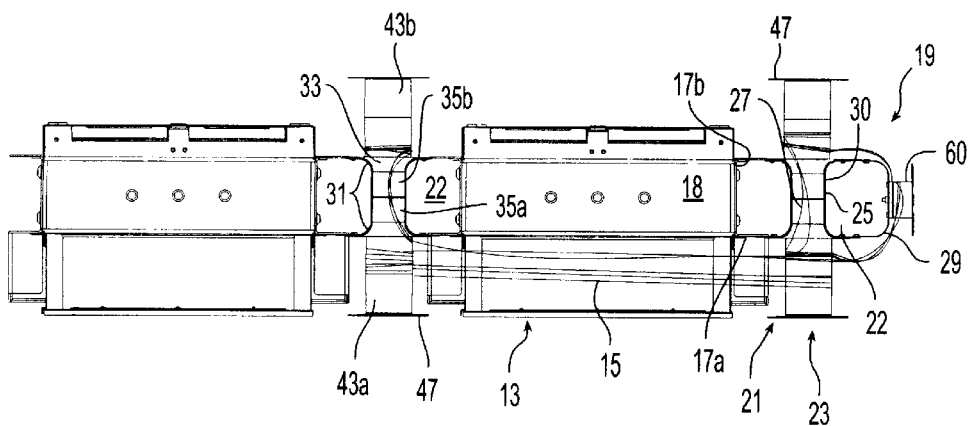
FIG. 2 is a top view of the storage racks of FIG. 1.

Referring to FIG. 1, an optical fiber storage rack 11 is shown. Rack 11 is a frame that supports a number of connector housing 13 in bays, one above the other. A typical rack 11 may be about seven feet in height and hold nine connector housings 13. Connector housings 13 are conventional patch panels with connector panels 14 that interconnect a large number of optical fibers 15. Rack 11 has two longitudinal frame members 17 that are spaced apart and interconnected to each other with lateral braces 18. A top view of frame members 17 and a lateral brace 18 is shown in FIG. 2, with two connector housings 13 attached to the frame members 17. Numeral 19 references the back side of rack 11, while numeral 21 references the front side.

A storage unit 23 is mounted to each lateral side of rack 11 in the preferred embodiment, as illustrated in FIG. 1. Referring again to FIG. 2, each storage unit 23 has a pair of longitudinally extending rails 25,27 that are parallel to and attached to frame members 17. Each rail 25,27 has a back flange 26, a front flange 28, and a connecting wall 30 that are perpendicular to flanges 26,28 (see FIG. 3). Outer rail 25 is identical to inner rail 27, except for being the mirror image when installed. The corners 31 between flange 26 and connecting wall 30 and between flange 28 and connecting wall 30 are curved at a desired minimum radius to avoid excessive bending of fibers 15, preferably 1.25 to 1.50 inch. Flanges 26,28 of the rails 25,27 are fastened to the frames members 17 of rack 11, creating a hollow column 22, allowing a fiber optic cable stub (not shown) to be run up the side of the rack 11 if required. As best seen in FIG. 2, frame members 17 have a longer front flange 17a than back flange 17b. The front flange 28 of storage unit 23 is shorter than the back flange 26 (see FIGS. 3 and 4), thereby allowing the flanges 26,28 of storage unit 23 to mate with the flanges of the frame members 17. However, other configurations (i.e., flange 17a is shorter than flange 17b and flange 28 is longer that flange 26.) are possible as well.

Figure 3:
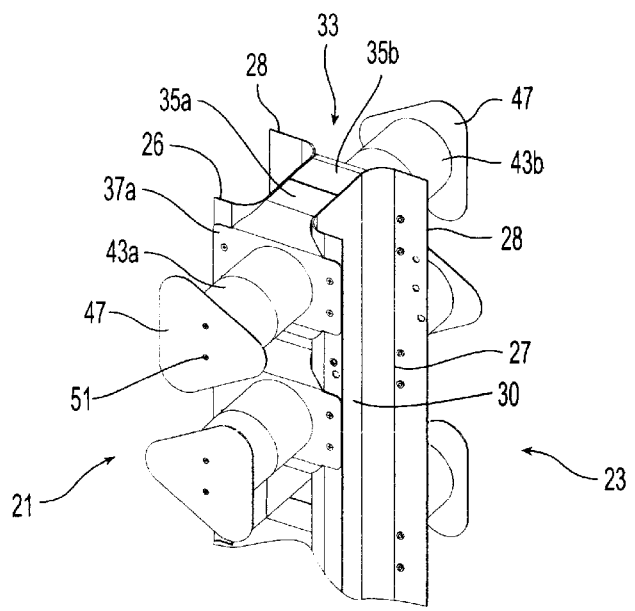
FIG. 3 is a partial isometric view of one of the storage units
Figure 4:
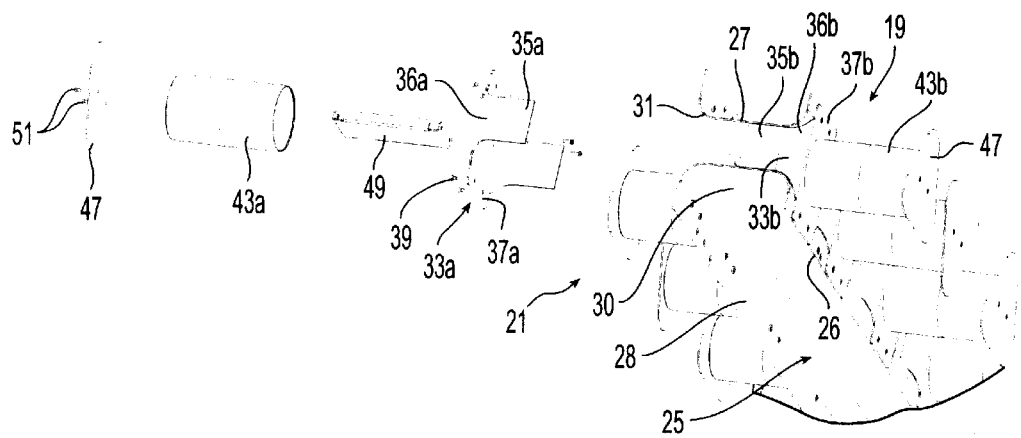
FIG. 4 is partial exploded isometric view as seen from the back and top of one of the storage units, with the end cap not being shown.
Figure 5:
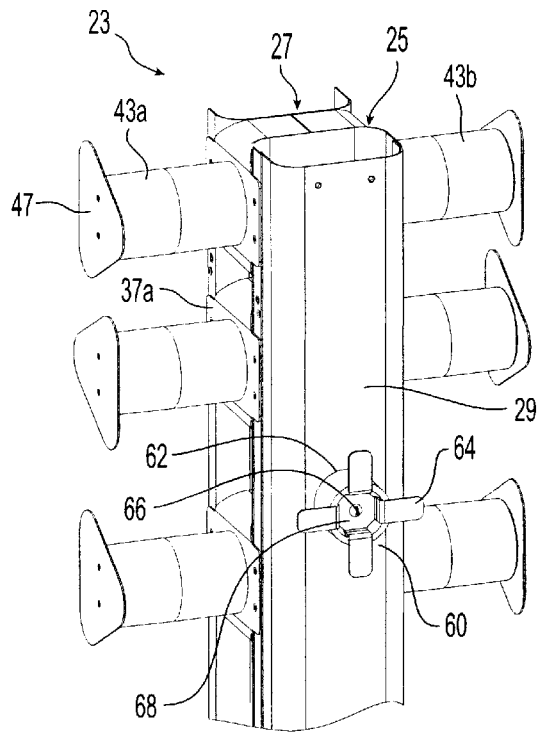
FIG. 5 is a partial isometric view of the storage unit with an end cap according to the present invention.

As shown more clearly in FIGS. 3 and 4, a plurality of spacers 33 are located between connecting walls 30 of rails 25,27. Spaces 33 are spaced longitudinally along rails 25,27. For example, there may be nine spacers 33 evenly spaced along the storage units 23. As shown in FIG. 4, each spacer 33 is formed in two symmetrical halves 33a,33b for ease in manufacturing and assembly. Spacer half 33a has upper and lower guide plate flanges 35a that are spaced longitudinally apart from each other and joined by a mounting plate 37a. Guide plate flanges 35a and mounting plate 37a are integrally formed with each other. A curved corner 36a is located at the junction of each guide plate flange 35a with mounting plate 37a. Corners 36a are preferably curved at the same radius as corners 31 to avoid excessive bending the optical fibers. Similarly, spacer half 33b has upper and lower guide plate flanges 35b that are spaced longitudinally apart from each other and joined by a mounting plate 37b. A curved corner 36b is located at the junction of each guide plate flange 35b with mounting plate 37b.

Spacers 33 are secured on top of flanges 26,28 of rails 25,27 with fasteners (e.g., screws, rivets, etc.) 39. The forward edges of guide plate flanges 35b abut the rearward edges of guide plate flanges 35a to define upper and lower guide plates that extend around and between the connecting walls 30 and corners 31. Mounting plates 37a,37b are on top of vertical flanges 28,26, respectively (see FIG. 1). This configuration defines openings 41 through the storage unit 23, which are shown in FIG. 1.

Figure 6:
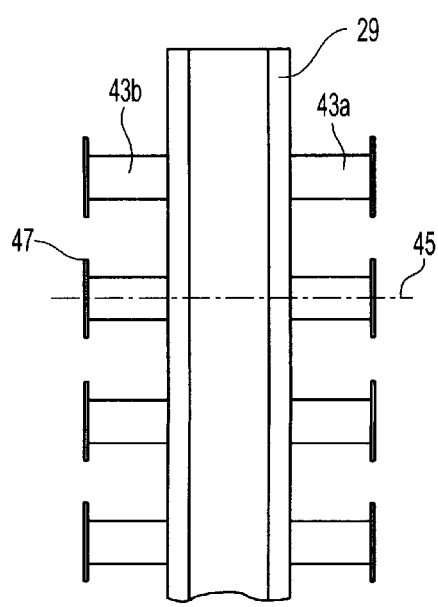
FIG. 6 is a partial side view of a second embodiment of the storage units according to the present invention.

Hubs 43a,43b are mounted to each mounting plate 37a, 37b of each spacer 33 with a bracket 49 and a retainer plate 47, as illustrated in FIG. 3. Referring to FIG. 4, one of the hubs 43b protrudes from mounting plate 37b at the back 19 of rack 11, while the other hub 43a protrudes forward from mounting plate 37a at the front 21. Each hub 43a,43b, is shown as a cylinder having a radius as specified above to avoid excessive bending of the optical fibers to be wrapped around and stored on the hubs 43a,43b. Hubs 43a,43b may be in two separate halves, separated from each other, however. As illustrated in FIG. 6, hub 43a has a hub axis 45 that is co-axial with the hub axis of hub 43b mounted to the same spacer 33 but on the opposite side of storage unit 23. However, the hubs 43a,43b need not be attached to both sides of each of the spacers 33, thereby allowing hubs not to be aligned on the front 21 and the back 19 of the storage unit 23. Rather, the spacers 33 may not have the hubs 43a,43b, the brackets 49, and the retainer plates 47 attached.

To attach the hubs 43a,43b to the spacers 33, one end of the bracket 49 is mounted to the spacer 33 using fasteners (e.g., screws, rivets, etc.), the hubs 43a,43b are slid over the bracket 49, and a retainer plate 47 is attached to the other end of the bracket 49, thereby securing the hubs between the spacer 33 and the retainer plate 47. In the embodiment illustrated in the figures, the retainer plate 47 is generally triangular in shape with rounded corners, however, other configurations (e.g., square, rectangular, oval, etc.) may be used. The retainer plates 47 are generally mounted in a plane parallel to the mounting plates 37.

In operation, a storage unit 23 is mounted to each side of rack 11 as shown in FIG. 1 (a second rack 16 may then be attached to the free side of each of the storage units 23, depending on the user's need and space availability). While installing the optical fibers 15, excess slack will be wrapped around the various hubs 43a,43b. The installer may extend fibers through the large openings 41, to allow the optical fibers to be routed from front 21 to back 19 of the storage unit 23, depending on the location of the connectors to be used and the needs of the installer, etc.

In the embodiment shown in FIGS. 1 and 2, an end cap 29 secures to flanges 26,28 of outer rail 25 when another rack is not attached to that side of the storage unit 23 to also define a hollow column 22 (see FIG. 2) and to make the end look more aesthetically pleasing. The end cap 29 preferably has end storage hubs 60. While only two end storage hubs are shown in FIG. 1, any number of end storage hubs 60 can be attached along the length of the end cap 29, which may or may not extend along the entire length of the storage unit 23. Alternatively, as shown in FIG. 6, the end cap 29 may not have any end storage hubs 60, but rather be radiused to prevent the excessive bending of the fibers if the fibers 15 are routed around the end cap 29.

The end storage hubs 60 have a central cylindrical element 62, which is attached to the end cap 29 with a fastener 68 (e.g., screw, rivet, etc.). The central cylindrical element 62 has an end piece 66 that includes a plurality of flanges 64 that help to retain the optical fibers on the hub 60. While the flanges 64 are shown to be comprised of four narrow, individual flanges, the end piece 66 and flanges 64 could be of any configuration, such as the single flange 47 on the front 21 and rear 19 of storage unit 23. The central cylindrical elements 62 have a radius that is greater than the desired minimum radius described above. The central cylindrical elements 62 may also be made of several components (e.g., two separate pieces that form an oval in cross-section) as long as the optical fibers 15 cannot violate the minimum radius when wrapped around them.

The end storage hubs 60 provide extra routing and storage options for the installers and the users of the storage units 23. The optical fibers 15 can be routed around the end cap 29 in going from front 21 to back 19 (or vice versa), rather than through the opening 41 in the center of the storage unit 23. An example of such routing is shown in FIGS. 1 and 2.

The invention has significant advantages. By providing hubs on both the front and the back, additional storage for optical fiber slack is provided. The large openings between the spacers and hubs provide convenient access between the front and back. The curved portions of the spacers and the rails prevent excessive bending of the optical fibers.

We claim:

1. An optical fiber storage unit for storing optical fiber used with storage racks, the storage unit comprising:

a pair of longitudinally extending parallel rails, each of the rails having a front and a back and being mountable to the storage racks;

a plurality of hubs for being wrapped with slack optical fibers, the hubs being spaced longitudinally along the rails, at least one of the plurality of hubs protruding rearward from the rails and at least one of the plurality of hubs protruding forward from the rails; and wherein the rails are laterally spaced apart from each other, defining openings between the rails for the passage of optical fibers from the front to the back.

2. The optical fiber storage unit according to claim 1, further comprising:

a plurality of spacers mounted between the rails, the spacers being longitudinally spaced apart from each other; and wherein the hubs are mounted to the spacers.

3. The optical fiber storage unit according to claim 1, wherein each of the rails comprises opposed connector walls, each of the connector walls defining a corner with the front and the back of each of the rails, and wherein the corners are curved to prevent excessive bending of the optical fibers.

4. The optical fiber storage unit according to claim 3, further comprising;

a plurality of spacers mounted between the rails, the spacers being longitudinally spaced apart from each other and having curved portions at the front and the back of the rails; and wherein the hubs are mounted to the spacers.

5. The optical fiber storage unit according to claim 1, wherein each of the hubs that protrude forward from the rails has a hub axis that is coaxial with one of the hubs protruding rearward from the rails, the hub axes being perpendicular to the rails.

6. The optical fiber storage unit according to claim 1, further comprising:

a plurality of spacers mounted between the rails, the spacers being spaced longitudinally apart; and wherein each of the spacers, comprises:

a pair of guide plates spaced longitudinally apart from each other and extending between opposed side walls of the rails;

a pair of mounting plates, one interconnecting forward portions of the guide plates and the other interconnecting rearward portions of the guide plates; and wherein the hubs are connected to the mounting plates.

7. The fiber optic storage system according to claim 2, wherein the plurality of hubs is at least as great as the plurality of spacers.

8. The fiber optic storage system according to claim 1, further comprising:
an end cap mountable to the parallel rails, the end cap and the parallel rail defining a longitudinal opening therebetween;
wherein the end cap is rounded to prevent excessive bending of the optical fibers.

9. The fiber optic storage system according to claim 8, the end cap further including at least one end cap hub mountable thereto, the end cap hub configured for being wrapped with optical fiber without excessive bending.

10. A fiber optic system, comprising:
a longitudinally extending rack having a front, a back, and two lateral sides, the rack configured to hold a plurality of fiber optic connector housings;
a pair of longitudinally extending parallel and laterally spaced apart rails mounted to at least one of the sides of the rack;
a plurality of spacers mounted between the rails, defining openings between the rails for the passage of optical fibers between the front and the back of the rack; and
a plurality of hubs for being wrapped with slack optical fibers, the hubs being mounted to the spacers, at least one of the plurality of hubs protruding rearward from the rails and at least another one of the plurality of hubs protruding forward from the rails.

11. The fiber optic system according to claim 10, wherein the plurality of hubs is at least as great as the plurality of spacers.

12. The fiber optic system according to claim 10, wherein each of the rails comprises a front flange and a back flange joined by and forming corners with a connector wall, the corners being curved to prevent excessive bending of the optical fibers.

13. The fiber optic system according to claim 10, wherein each of the spacers, comprises:
a pair of guide plates spaced longitudinally apart from each other and extending between the rails transverse to the rails;
a pair of mounting plates, one interconnecting forward portions of the guide plates and the other interconnecting rearward portions of the guide plates; and
wherein the hubs are connected to the mounting plates.

14. The fiber optic system according to claim 13, wherein a corner is located at a junction of each of the guide plates with the mounting plates, each of the corners being curved to prevent excessive bending of the optical fibers.

15. The fiber optic system according to claim 10, wherein each of the hubs protruding forward from the rails has a hub axis that is coaxial with one of the hubs protruding rearward from the rails, the hub axes being perpendicular to the rails.

16. The fiber optic system according to claim 10, further comprising a plurality of retainer plates, each mounted to one of the hubs and spaced from the rails.

17. The fiber optic system according to claim 10, further comprising:
an end cap mountable to the parallel rails, the end cap and the parallel rail defining a longitudinal opening therebetween;
wherein the end cap is rounded to prevent excessive bending of the optical fibers.

18. The fiber optic system according to claim 17, the end cap further including at least one end cap hub mountable thereto, the end cap hub configured for being wrapped with optical fiber without excessive bending.

19. An optical fiber storage unit for storage racks, the storage unit comprising:
a pair of parallel rails, each of the rails having a front side and a back side joined by a connector wall, defining corners that are curved, each of the rails having a longitudinal axis;
a plurality of spacers mounted between the rails, the spacers being spaced apart along the longitudinal axis and defining openings between the rails for the passage of optical fibers between the front side and the back side of the rails, each of the spacers having guide plates that are located between the rails and are joined by mounting plates, forming corners that are curved; and
a plurality of hubs for being wrapped with slack optical fibers, the hubs being mounted to the mounting plates of the spacers, at least one of the plurality of hubs protruding rearward from the rails and at least one of the plurality of hubs protruding forward from the rails.

20. The storage unit according to claim 19, wherein each of the hubs protruding rearward from the rails has a hub axis that is coaxial with one of the hubs protruding forward from the rails.

21. The storage unit according to claim 19, wherein each of the mounting plates is located in a plane that is substantially flush with a plane containing one of the front side and back side of the rails.

22. The storage unit according to claim 19, further comprising a plurality of retainer plates, each mounted to a free end of one of the hubs and spaced from the rails.

23. The storage unit according to claim 19, further comprising:
an end cap mountable to the parallel rails, the end cap and the parallel rail defining a longitudinal opening therebetween;
wherein the end cap is rounded to prevent excessive bending of the optical fibers.

24. The storage unit according to claim 23, the end cap further including at least one end cap hub mountable thereto, the end cap hub configured for being wrapped with optical fiber without excessive bending.

* * * * *